Figure 1:
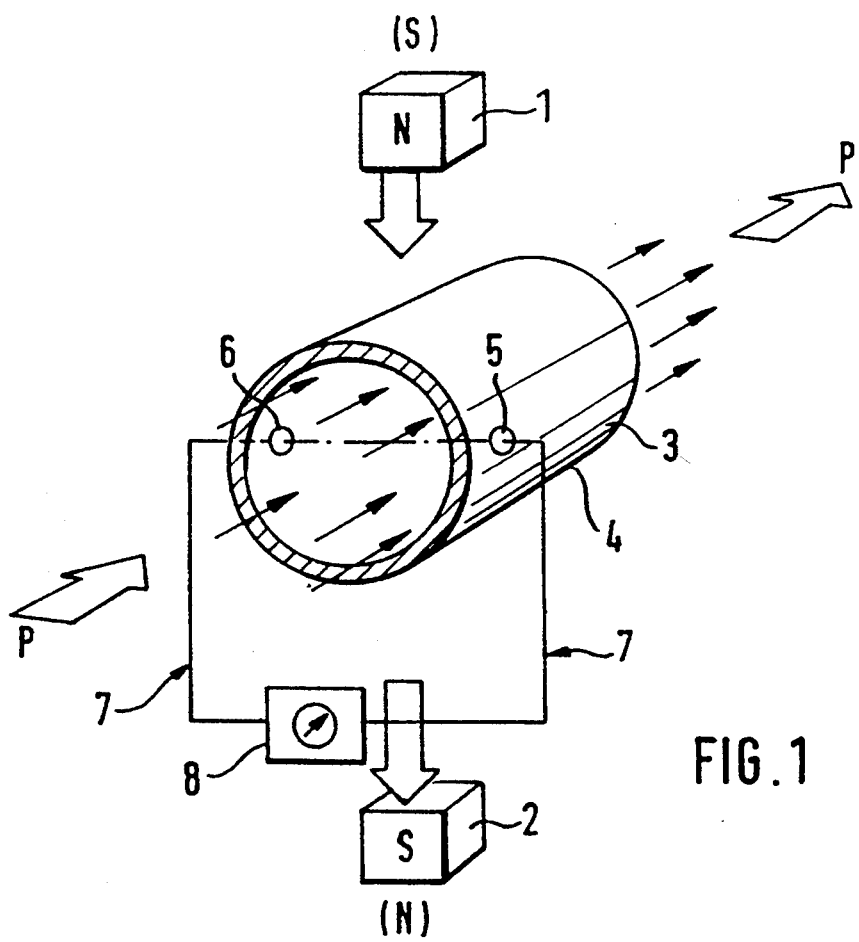

United States Patent [19]

Ketelsen et al.

[11] Patent Number: 5,448,920
[45] Date of Patent: Sep. 12, 1995

[54] DEVICE FOR INDUCTIVELY MEASURING THE STATE OF A STREAM OF ELECTRICALLY CONDUCTIVE LIQUID

[76] Inventors: Broder Ketelsen; Andres Ketelsen, both of Asternweg 15, D-3405 Rosdorf 9, Germany

[21] Appl. No.: 930,429
[22] PCT Filed: Jan. 15, 1992
[86] PCT No.: PCT/EP92/00075
§ 371 Date: Nov. 16, 1992
§ 102(e) Date: Nov. 16, 1992
[87] PCT Pub. No.: WO92/13256
PCT Pub. Date: Aug. 6, 1992

[30] Foreign Application Priority Data

Jan. 15, 1991 [DE] Germany .......... 41 00 987.8

[51] Int. Cl.$^6$ .............. G01F 1/58
[52] U.S. Cl. .............. 73/861.12; 73/861.11
[58] Field of Search .......... 73/861.11, 861.12, 861.08

[56] References Cited

U.S. PATENT DOCUMENTS 3,795,140 3/1974 Nishihara .......... 73/862.639
3,805,161 4/1974 Bayha et al. .......... 73/519 X
4,338,815 7/1982 Peters et al. .......... 73/118.2

Primary Examiner—Richard E. Chilcot, Jr.
Assistant Examiner—Elizabeth L. Dougherty
Attorney, Agent, or Firm—Fishman, Dionne & Cantor

[57] ABSTRACT

A device is disclosed for inductively measuring the flow rate and/or the height of a liquid stream in a flow channel having a wall with isolated sections and mutually opposite electrodes for detecting a measurement voltage, as well as a magnetic field generating system for generating an alternating magnetic field that extends axially or transversely to the axis of the channel. In order to avoid induced noise voltages in the signal transmission arrangement that links the electrodes to a display or recording device, at least one of the electrodes is linked to the display or recording device by a short circuit ring which surrounds the flow channel.

15 Claims, 6 Drawing Sheets

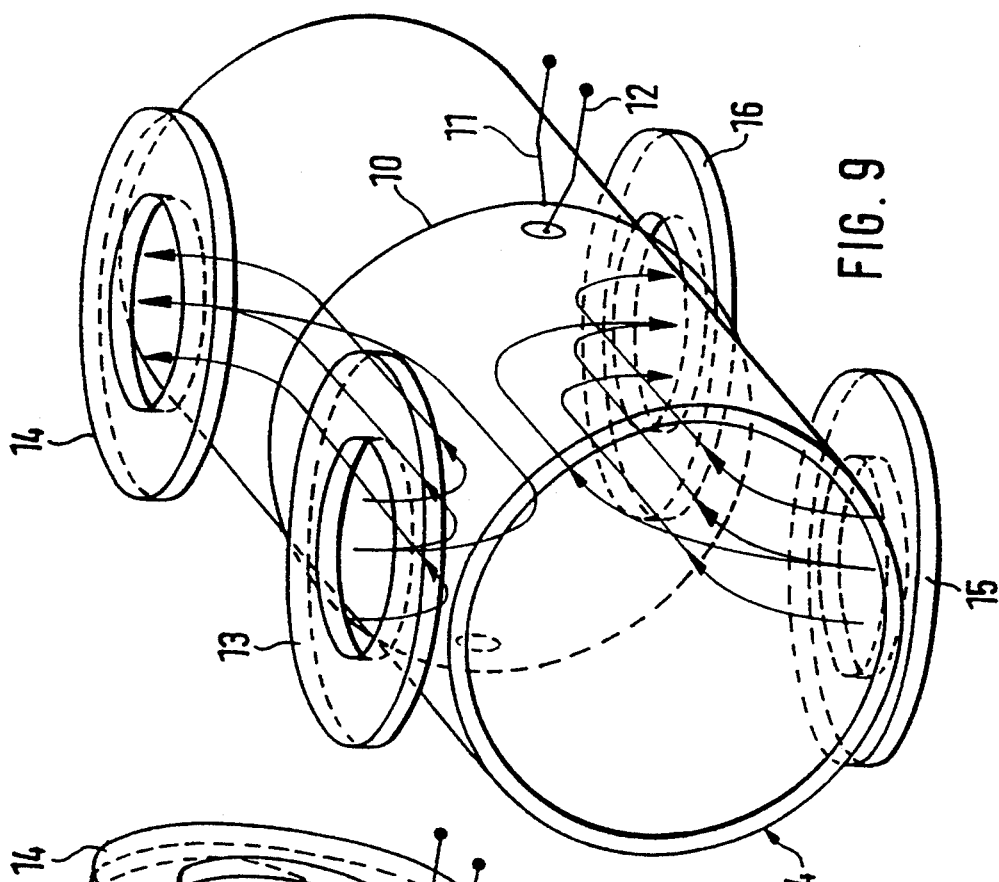
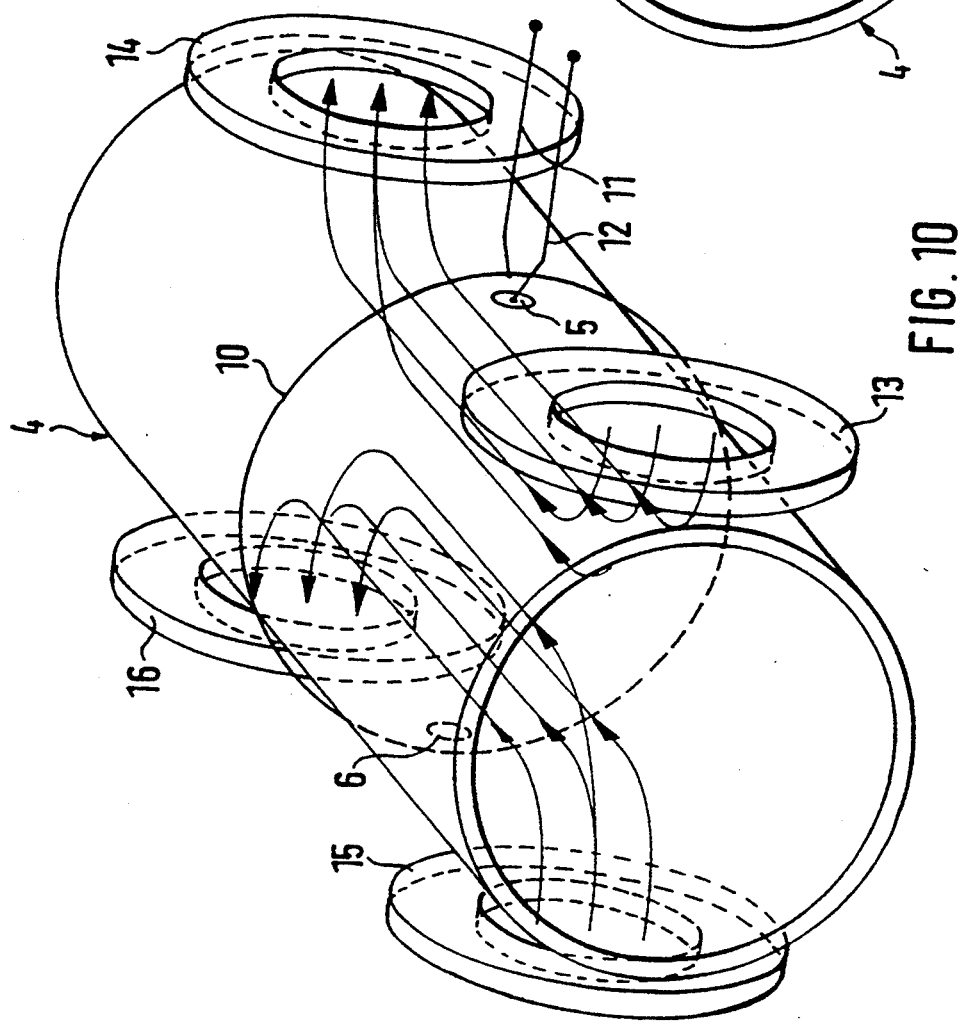

DEVICE FOR INDUCTIVELY MEASURING THE STATE OF A STREAM OF ELECTRICALLY CONDUCTIVE LIQUID

The invention concerns a device for inductively measuring the state of a stream of electrically conductive liquid in a flow channel that contains, in an isolated section of the channel, a pair of electrodes opposite one another over the cross section of the channel, in or on the wall, that make contact with the liquid, and a magnetic field generating system to excite a changing magnetic field passing through the liquid stream, wherein the electrodes are connected to a display or recording device via a signal transmission arrangement.

Determining the state of a stream of electrically conductive liquid in a flow channel is understood to mean both measuring the inductive flow and inductively finding the height of the cross section of the liquid stream when the cross section of the channel is not completely filled.

In a device of the type generally considered here, if the flow is to be measured inductively, a magnetic field generating system is used that generates magnetic field lines that pass through the flow channel roughly parallel to the plane of the cross section of the channel containing the electrodes and diagonally to the connecting line between the electrodes.

On the other hand, if the height of the liquid stream in a cross section of the channel that is not completely full is to be found inductively, the field lines of the magnetic field generating system pass through the flow channel in a direction parallel to the axis of the flow channel. In any case, the magnetic field is alternating or pulsing.

If the cross section of the flow channel is not completely filled with the stream of liquid, then changing the conductive cross section causes the induced electrical field lines to move between the electrodes in the liquid stream, so that there is a difference in potential between the electrodes, from which a display of the height of the liquid stream in the flow channel can then be derived.

The magnetic field lines, which run basically parallel to the axis in the flow channel, and the accompanying stray fields induce voltages, both in the volume of liquid and in the conductive parts of the surrounding structure, especially in the signal transmission arrangement where the electrodes are connected to the display and recording device; such voltages are in phase at the measurement voltage in question, depending on the changing height of the liquid stream, but actually have nothing to do with this measurement signal, distort it and cannot be eliminated by phase-selective filtering.

When such noise voltages, caused primarily by induced voltages in the signal transmission arrangement, assume rather substantial proportions, the measurement signal in question can be drowned out, so that the device in question for inductively measuring the height of the liquid stream in the flow channel is unusable, or very expensive designs must be used.

The aforementioned problems also apply to devices for measuring inductive flow with a magnetic field generating system in which the field lines generated basically run transversely through the flow channel, to the extent that these magnetic field generating systems, because of their design or because of directional errors or even because of asymmetries that occur during operation, have magnetic field components that are parallel to the longitudinal axis of the flow channel. This is true to a very great extent in all practical cases. Because magnetic alternating fields or pulsing magnetic fields are also used for inductive flow meters and because of the need to provide a signal transmission arrangement to connect electrodes diametrically opposite one another to the display and recording device, there are also conductive loops on conventionally designed inductive flow meters in which those axial components of the magnetic alternating field or pulsing magnetic field induce noise voltages which distort the measurement results.

The task of the invention is therefore to design a device for inductively measuring the state of a current of electrically conductive liquid in a flow channel, so that noise signals that distort the measurement results, which are caused by magnetic field components in the magnetic field generating system that are parallel to the axis of the flow channel and by such stray magnetic components, can be eliminated with a simple design for a large number of structures in the magnetic field generating system.

This task is solved according the invention characterized by the fact that a signal transmission arrangement contains at least one short-circuit ring connected to one of a pair of electrodes opposite one another at a section of the channel; which surrounds the flow channel in or near this section including the electrodes; and is connected to a display or recording device.

Examples of embodiment will be explained in greater detail below using the drawings.

Figure 3:
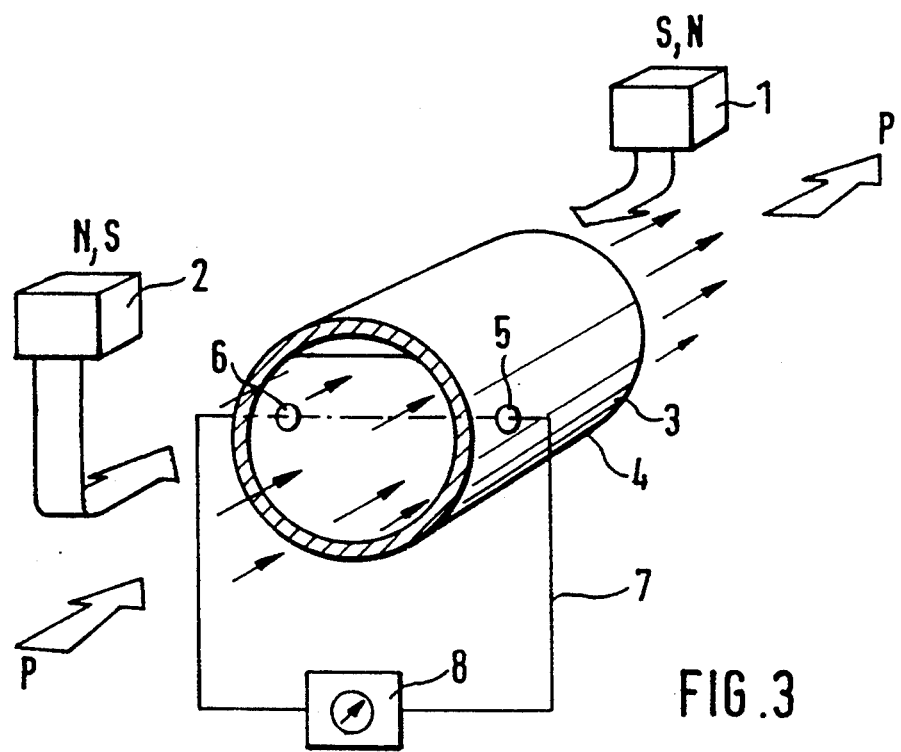
Figure 2:
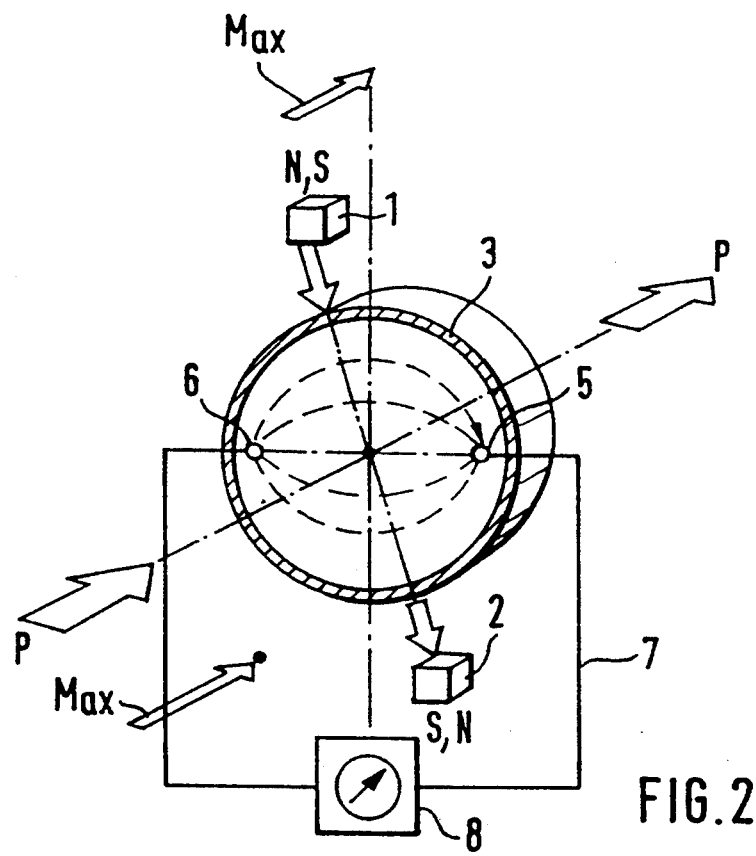
Figure 4:
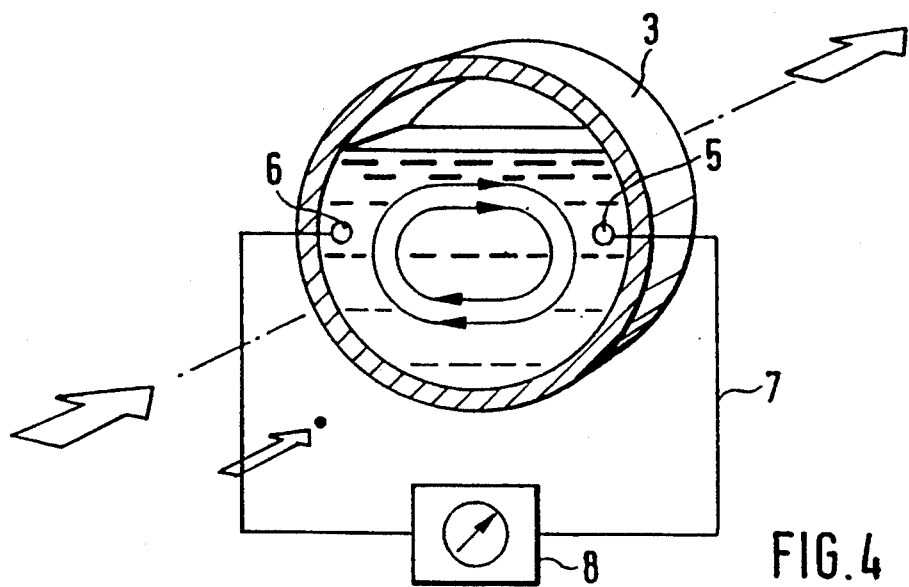
Figure 5:
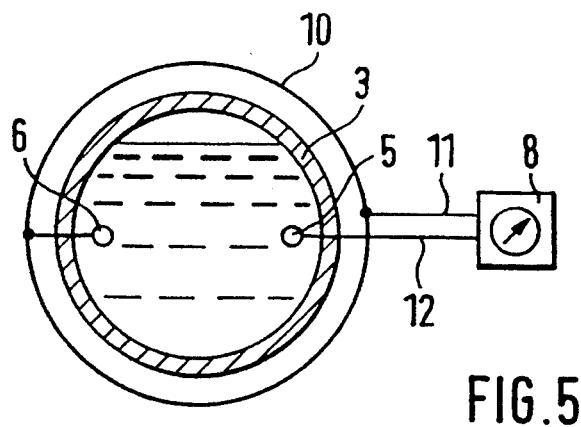
Figure 6:
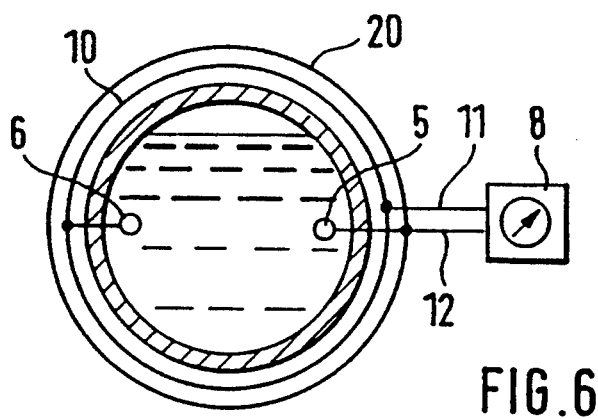
Figure 7:
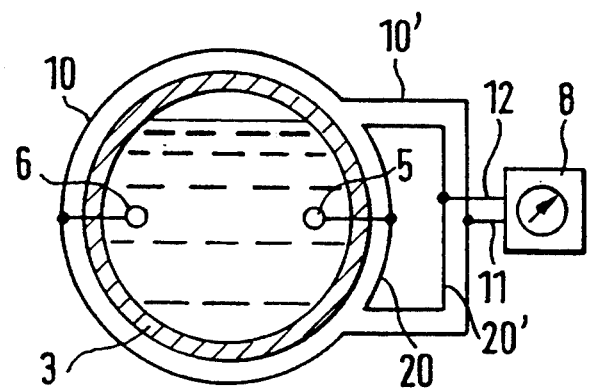
Figure 8:
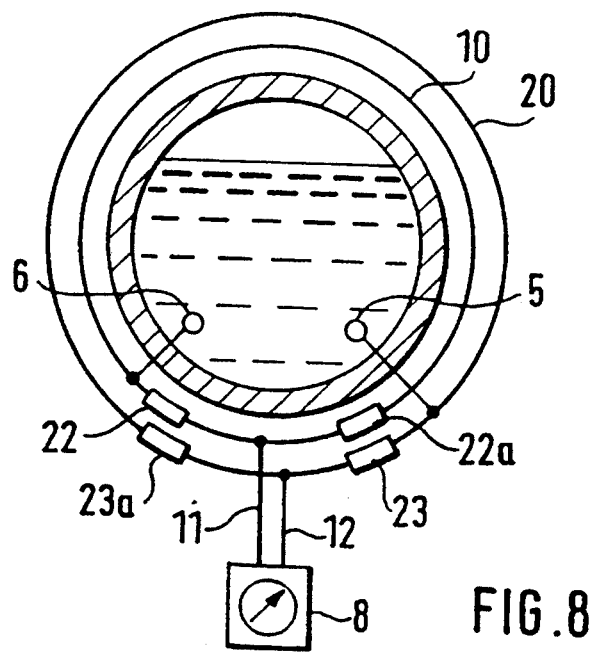

FIG. 1 shows a schematic, perspective figure of an inductive flow meter,

FIG. 2 shows a schematic, perspective figure similar to the one in FIG. 1 to explain the materialization of an axial component of the magnetic field and its effect, FIG. 3 shows a schematic, perspective figure of an inductive measuring system to find the height of a liquid stream in a flow channel, FIG. 4 shows a schematic, perspective figure similar to the one in FIG. 3 to explain the materialization of noise voltages that distort the measured value, FIG. 5 shows a schematic representation of a cross section of the flow channel, the measurement electrodes and the signal transmission arrangement FIGS. 6 to 8 are drawings similar to FIG. 5 of modified forms of the signal transmission arrangement and FIGS. 9 to 13 are schematic, perspective drawings of the flow channel, the measurement electrodes, the signal transmission arrangement and various forms of magnetic field generating systems.

FIG. 1 shows a schematic view of an inductive flow meter, in which a section 4 of a flow channel with an electrically isolated wall 3 runs between the magnetic poles 1 and 2 of the magnetic field generating system; and an electrically conductive liquid is fed through the channel in the axial direction, as shown by the arrow P.

Near the section 4, in which the field lines of the magnetic field generating system pass through the inside of the flow channel, there are electrodes 5 and 6 on the inner wall, which are connected to a display and recording device 8 via a signal transmission arrangement 7. If the electrically conductive liquid moves in the section 4 through the magnetic field basically transversely to the connecting line between the electrodes 5 and 6 and transversely to the axis of the flow channel of the magnetic field generating system, then currents are induced in the liquid that cause a difference in potential corresponding to the flow between the electrodes 5 and 6 which is analyzed by the display and recording device 8. Now, in order to avoid the effects of polarization on the surfaces of the electrodes 5 and 6 and to achieve other technical measuring advantages, an alternating current or switched direct current sent through electromagnets in the magnetic field generating system is used to activate the magnetic field, and the alternating voltage or pulsing direct voltage in the device 8 at the electrodes 5 and 6, which is flow-dependent, is then analyzed.

Since the magnetic field lines running between the magnetic poles 1 and 2 run basically parallel to the plane that is set up by the path of the current through the electrically conductive liquid between the electrodes 5 and 6, through the signal transmission arrangement 7 and the display or recording device in the form of a conductive loop, then, when the magnetic field between the magnetic poles 1 and 2 is an alternating field or a pulsing direct field, no currents are induced in this conductive loop, and the resulting alternating current or pulsing direct current between the electrodes 5 and 6 is dependent only on an undistorted flow through the section 4.

But, as FIG. 2 shows, if, for example, the magnetic poles 1 and 2 parallel to the axis of the flow channel are staggered upstream and downstream, then the magnetic field of the magnetic field generating system has an axial component corresponding to the arrow $M_{ax}$, which—in a radial plane containing the electrodes 5 and 6 in relation to the axis of the flow channel in the liquid stream—induces eddy currents and, over the resulting magnetic field, induces noise voltages in the conductive loop that consists of the conductive path between the electrodes 5 and 6, the signal transmission arrangement 7 and the display and recording device. In addition, stray fields corresponding to the axial components of the magnetic field cause noise voltages to be induced directly in the conductive loop specified. The course of the magnetic field lines between the magnetic poles 1 and 2 giving the magnetic field an axial component can also be caused by a design-related, staggered arrangement of the electromagnets in the magnetic field generating system, in addition to an unintentional staggering of the magnetic poles.

In an inductive measurement system for finding the height of the liquid stream in the flow channel, in order to produce a magnetic alternating field or a pulsing magnetic direct field, the magnetic poles 1 and 2 of the magnetic field generating system are deliberately placed at some distance from one another along the axis of the flow channel. The cyclic currents induced by an axial magnetic field within the flow channel in radial planes to the longitudinal axis of the flow channel run parallel to the inner wall of the channel when the flow channel is completely filled, if it is circular in cross section, for example. But if the level of liquid in the flow channel falls, the induced cyclic currents move the distribution of the potential in the conductive liquid between the measurement electrodes, so that a potential difference occurs at the electrodes 5 and 6, depending on the fill height. The axial magnetic field and stray portions of it also induce eddy currents in the liquid with resulting axial magnetic fields, which lead to noise voltages, in conjunction with the magnetic field components and stray components in the conductive loop that goes directly through the conductive loop mentioned.

FIGS. 5 to 8 show schematic drawings of signal transmission arrangements that avoid conductive loops in measuring the height of the liquid current in the flow channel inductively and in measuring the flow in which noise voltages can be induced inductively. In the signal transmission arrangement between the electrodes 5 and 6 and on the display and recording device 8 in FIG. 5, a short-circuit ring 10 connected to the electrode 6 via a line and surrounding the isolating wall 3 at short intervals, surrounds the flow channel and is connected to a point diametrically opposite the electrodes 6 via a branch conduit 11 to the device 8. The electrode 5 is also connected to the device 8 via a branch conduit 12 directly next to the branch conduit 11. The branch conduits 11 and 12 basically run radially in relation to the center axis of the flow channel, which is circular and disk-shaped in cross section. Axial magnetic fields or axial components of magnetic fields which pass through conductive loops in such a way that noise voltages occur where they are connected to the display and recording device 8 and are superimposed over the effective measurement signal are avoided with the signal line arrangement in FIG. 5. In the short-circuit ring 10, currents induced by such axial magnetic fields or magnetic field components—at the connecting point between the short—circuit ring 10 and the branch conduit 11—do not cause substantial differences in potential compared to the connecting point of the electrode 6 on the short-circuit ring 10, especially if the short-circuit ring 10 has a low enough resistance, so it does not really depend very much on the distribution of the magnetic field passing through the short-circuit ring 10 within the cross section of the flow channel.

But it should especially be pointed out that there are preferred locations for the point where the short-circuit ring 10 is connected to the branch conduit 11, if the density of the lines of force of the axial magnetic field or the axial magnetic field components is not homogenous over the cross section of the flow channel 4, but rather, at certain axial mid-longitudinal planes of the flow channel section 4, has symmetries which cause certain peripheral sections of the short-circuit ring 10 that periodically follow one another during the alternating or pulsing effect of the magnetic field to have a generating effect and certain other peripheral sections to act as consumers. This results in the fact that, in such cases, the potential distribution around the short-circuit ring 10 has the form of consecutive maximum amplitudes and nulls, wherein the null level is given by the potential set on the electrode 6. Nulls outside the area where the electrode 6 is connected to the short-circuit ring are preferred connection sites for the branch conduit 11.

In general, it can be said that the points where the branch conduit 11 could be connected to the short-circuit ring 10 lie where an axial symmetrical plane of the axial magnetic field or the axial magnetic field components cuts the conductive ring 10.

These statements will be clear from FIGS. 9 to 13.

FIG. 9 shows a device suitable for both inductive flow measurement and for inductive measurement of the height of the liquid stream in the flow channel, in which the magnetic field generating system is composed of pairs of upper and lower coils, which are staggered upstream and downstream in relation to the radial plane containing the electrodes 5 and 6. When the coils 13 and 14 are excited in an appropriate way, an upper part of the axial magnetic field going through the flow cross section is created and when the lower coils 15 and 16 are excited, the lower part of the magnetic field flowing axially through the flow cross section is created. (Note that if the coils 13 and 15 are excited in the same direction and the coils 14 and 16 are excited in the same direction, magnetic fields going diagonally through the cross section of the flow channel can be formed for inductive flow measurement; and, here again, axial components of the magnetic fields can be created). The magnetic fields drawn in FIG. 9 have a central vertical longitudinal plane as a symmetry plane and a central horizontal longitudinal plane as a symmetry plane. The branch conduit 11 can thus be connected both to the short-circuit ring 10 in the place shown near the electrode 5 or at the highest point on the short-circuit ring 10 and on its lowest point in relation to the position of the components shown in FIG. 9. The drawing in FIG. 10, which corresponds to the general design in FIG. 9, shows a device in which the magnetic field generating system is rotated 90° on the longitudinal axis of the flow channel compared to the position in FIG. 9. Here again, there is a central vertical longitudinal plane as a symmetry plane and a central horizontal longitudinal plane as a symmetry plane of the axial magnetic field. To connect the branch conduit 11 to the short-circuit ring 10, the same applies as for the device in FIG. 9.

Figure 11:
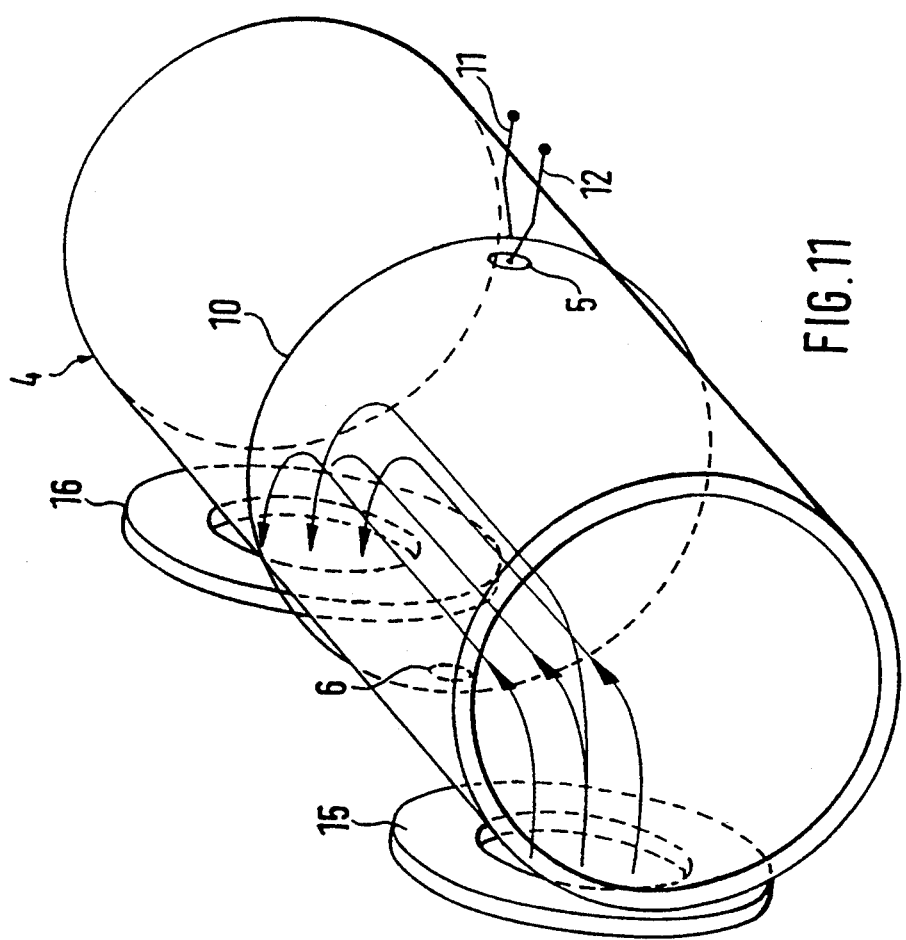

In the device in FIG. 11, compared to the device in FIG. 10, only coils 15 and 16 are provided as the magnetic field generating system, and they generate an axial magnetic field in the left part of the flow channel. This magnetic field has only one central horizontal longitudinal axis as the symmetry plane when the coils 15 and 16 are arranged opposite the longitudinal axis of the flow channel. This cuts the short-circuit ring 10 near the electrodes 5 and 6. The preferred point for connecting the branch conduit 11 to the short-circuit ring 10 is therefore shown only in FIG. 11.

Figure 13:
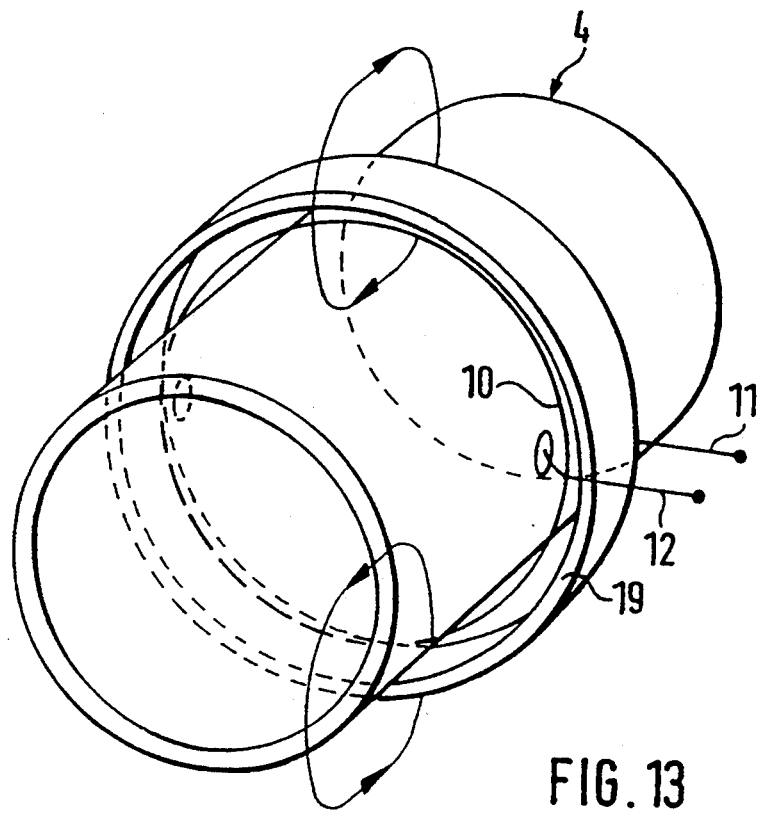
Figure 12:
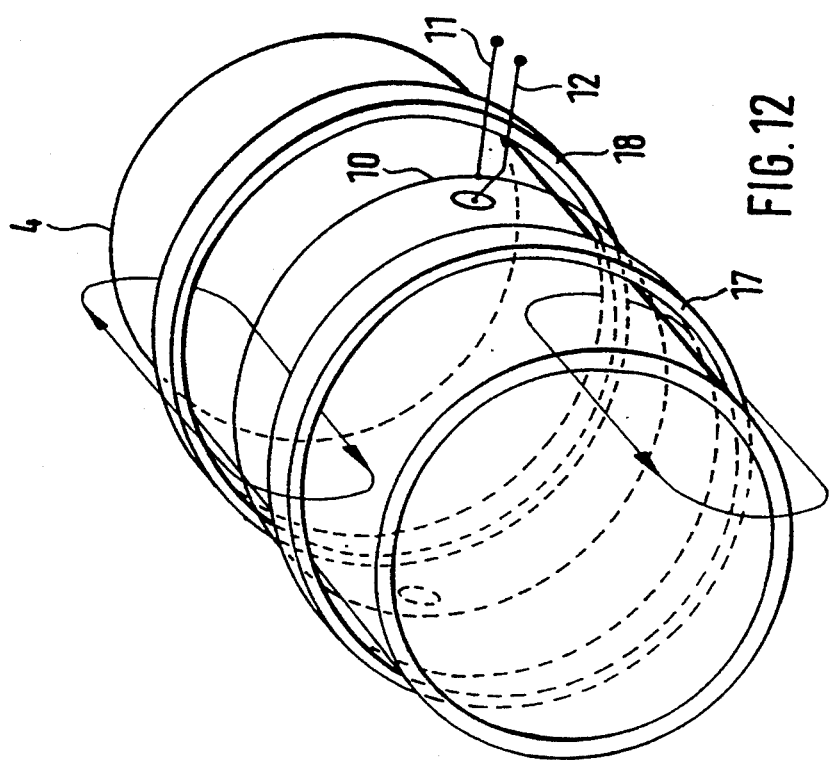

Finally, FIGS. 12 and 13 contain forms of embodiment of the device specified here, in which the axial magnetic field in the section 4 of the flow channel is generated by two coils 17 and 18 surrounding the flow channel section 4 upstream and downstream and a coil 19 surrounding the flow channel section 4 near the electrodes 5 and 6. In both cases, the axial magnetic field generated is symmetrical in rotation in relation to the central longitudinal axis of the flow channel section 4. The branch conduit 11 can be placed at any point on the short-circuit ring 10.

It is convenient that the branch conduits 11 and 12 are led away from the respective preferred point of connection radially in relation to the central longitudinal axis of the flow channel 4, so that no noise voltages are induced in these sections of the line under the given symmetry conditions. However, this characteristic is not highly significant if the branch conduits are twisted.

In the signal transmission arrangement shown in FIG. 6, a short-circuit ring 10 is connected to the electrode 6, and a short-circuit ring 20 is connected to the electrode 5. The short-circuit rings are connected to the display and recording device 8 by the branch conduits 11 and 12.

FIG. 7 shows a form of embodiment in which the ring 10 connected to the electrode 6 is directly adjacent to the wall 3 of the section 4 of the flow channel only in one subsection, then goes away from the wall on the outside and forms a loop section 10', which in turn is connected to the device 8 via the branch conduit 11. The loop section 10' could go through an axial magnetic stray field, which would cause noise voltages on the branch line 11 if there were asymmetries in this stray field. But the measuring electrode 5 is connected to the part of the line of a short-circuit ring marked 20; and this part of the line is adjacent to the flow channel section 4 in that peripheral area where the short-circuit ring 10 is not adjacent to the flow channel section 4. Then the conductor of the ring part 20 is removed from the flow channel section and forms a loop section 20', whose cross sectional surface exactly matches the cross sectional surface of the loop section 10'. This creates a compensation loop, through which noise voltages occurring roughly at the connecting point of the branch line 11 are offset by means of voltages on the branch conduit 12.

Note that the device in FIG. 7 does not contain pairs of lines leading away from the conductive ring parts 10 and 20 as lines to the separate transducer, which are then connected to a compensation switch, but rather that, according to FIG. 7, the upper and lower pairs of lines are connected directly to the line loops 10' and 20' so that here virtual geometric compensation is achieved, with no need for a comparatively complicated electrical switch.

Finally, FIG. 8 shows how, by switching on resistance elements 22, 22a and 23, 23a in the short-circuit rings 10 and 20, the position of the preferred point where the branch conduits 11 and 12 are connected on the periphery to the short-circuit rings can be changed relative to the position of the connections of the electrodes 6 and 5 in such a way that when the electrodes 5 and 6 are in the desired position, roughly in the lower part of the cross section of the flow channel, the branch conduits 11 and 12 close to one another can go back down radially away from the short-circuit rings to the device 8. The resistance elements 22, 22a, and 23, 23a, when turned on, cause desired displacements of the null crossovers of the potential oscillations along the periphery of the short-circuit rings 10 and 20 in relation to the potential level given by the potentials of the electrodes 6 and 5.

The following general remarks are added for better understanding of the attached claims.

Conductive ring 10 and/or conductive rings 10 and 20 on the forms of embodiment in FIGS. 5, 6 and 8 to 13 are also understood to be conductive bodies whose connecting point to the display and recording device 8 is not directly on the outer wall of the channel, but in which this connecting point is also directly on the recording or display device 8, in such a way that, for example in the form of embodiment in FIG. 6, the connecting lines 11 and 12 are replaced by twisted pairs of conductors and the conductive rings 10 and 20 are only connected to the recording and display devices 8 on the side geometrically, but not electrically.

For the measurement electrodes 5 and 6, unlike the electrodes shown in the forms of embodiment in the drawings, there can also be electrodes which are known, working capacitively that are mounted on the outside of the wall.

While the examples of embodiment in the drawing show flow channel sections 4 that are round in cross section, in corresponding cases of application, rectangular or square or oval cross sections or the like can also be chosen, which is then taken into account accordingly in analyzing the measurement signal obtained.

It is common to the forms of embodiment in FIGS. 10, 11, 12 and 13 that because of the arrangement of the magnetic field generating system, an axial magnetic field is generated exclusively from it, so that only measurement signals occur on the measurement electrodes 5 and 6, depending on the fill height in the flow channel, while field components that are perpendicular to the channel axis and perpendicular to the connecting line between the measurement electrodes cannot be found. If magnetic field generating systems in FIGS. 10 to 13 are combined with another magnetic field generating system, which has the task, in inductive flow measurement, of generating a magnetic field perpendicular to the channel axis and perpendicular to the connecting line between the measurement electrodes, then it is possible simultaneously to measure the fill height and the flow using the measurement signals derived from the measurement electrodes 5 and 6 without conversion, since in that time interval, the part of the signal for measuring the flow is in phase with the excitation, while the part of the signal for measuring the fill height, because of the induction reactions causing it, is displaced 90° compared to the excitation, in such a way that the parts of the signal of interest can be obtained by phase filtering the signal from the measurement electrodes.

We claim:

1. A device for inductively measuring a state of a current of an electrically conductive liquid comprising:
   a flow channel receptive to the electrically conductive liquid, said flow channel including an electrically isolated wall;
   a pair of electrodes disposed opposite one another at a cross section of said flow channel;
   magnetic field generating means for generating a changing magnetic field which passes through a stream of the electrically conductive liquid in said flow channel; and
   a signal transmission arrangement including at least one short-circuit ring which surrounds said flow channel at about said cross section including said electrodes, said at least one short-circuit ring connected to one of said electrodes and connected to at least one of a display device and a recording device.

2. The device of claim 1 wherein said electrodes are in contact with the electrically conductive liquid.

3. The device of claim 1 wherein said electrodes are capacitively coupled with the electrically conductive liquid.

4. The device of claim 1 wherein said electrodes are disposed within said wall.

5. The device of claim 1 wherein said electrodes are disposed on said wall.

6. The device of claim 1 wherein said at least one short-circuit ring comprises two short-circuit rings.

7. The device of claim 6 wherein said short-circuit rings surround said flow channel in subsections, wherein a subsection of one of said short-circuit rings and a subsection of the other one of said short-circuit rings together include a total outer periphery of said flow channel; and
   further comprising, conductive loops connecting said subsections of said short-circuit rings, said conductive loops being generally congruent.

8. The device of claim 1 further comprising:
   branch conduits connecting said at least one short-circuit ring to at least one of the display device and the recording device, said branch conduits are twisted and run radially in relation to a center axis of said flow channel.

9. The device of claim 1 wherein said at least one short-circuit ring is connected to at least one of the display device and the recording device at peripheral points, wherein said at least one short-circuit ring is cut by axial central longitudinal planes as symmetrical planes of axial magnetic fields of said magnetic field generating means.

10. The device of claim 1 further comprising:
    resistive elements in said at least one short-circuit ring.

11. The device of claim 1 wherein said magnetic field generating means comprises:
    a first pair of coils arranged on one side of said flow channel, one of said first coils being staggered in relation to one of said electrodes on said one side of said flow channel upstream therefrom and the other one of said first coils staggered in relation to said one of said electrodes on said one side of said flow channel downstream therefrom, said first coils for generating an axial magnetic field when excited that is symmetrical to a horizontal plane containing said one of said electrodes.

12. The device of claim 11 wherein said magnetic field generating means further comprises:
    a second pair of coils arranged the other side of said flow channel, one of said second coils being staggered in relation to the other one of said electrodes on said other side of said flow channel upstream therefrom and the other one of said second coils staggered in relation to said other one of said electrodes on said other side of said flow channel downstream therefrom, said second coils for generating an axial magnetic field when excited that is symmetrical to a horizontal plane containing said other one of said electrodes.

13. The device of claim 11 further comprising:
    another magnetic field generating means disposed generally perpendicular to a center axis of said flow channel and generally perpendicular to a line connecting said electrodes.

14. The device of claim 1 wherein said magnetic field means comprises:
    at least one coil surrounding said flow channel upstream and downstream of said electrodes.

15. The device of claim 1 wherein said channel has a cross section which is generally rectangular, square, oval or round.

* * * * *